United States Patent
Yeo et al.

(10) Patent No.: US 11,405,090 B2
(45) Date of Patent: Aug. 2, 2022

(54) METHOD AND APPARATUS FOR ANTENNA BEAM TRACKING IN WIRELESS CELLULAR COMMUNICATION SYSTEM

(71) Applicant: Samsung Electronics Co., Ltd., Gyeonggi-do (KR)

(72) Inventors: Jeongho Yeo, Gyeonggi-do (KR); Hoondong Noh, Gyeonggi-do (KR); Sungjin Park, Gyeonggi-do (KR); Jinyoung Oh, Gyeonggi (KR)

(73) Assignee: Samsung Electronics Co., Ltd

( * ) Notice: Subject to any disclaimer, the term of this patent is extended or adjusted under 35 U.S.C. 154(b) by 90 days.

(21) Appl. No.: 16/955,878

(22) PCT Filed: Dec. 21, 2018

(86) PCT No.: PCT/KR2018/016442
§ 371 (c)(1),
(2) Date: Jun. 19, 2020

(87) PCT Pub. No.: WO2019/125037
PCT Pub. Date: Jun. 27, 2019

(65) Prior Publication Data
US 2021/0099224 A1 Apr. 1, 2021

(30) Foreign Application Priority Data
Dec. 21, 2017 (KR) .................. 10-2017-0177108

(51) Int. Cl.
*H04B 7/08* (2006.01)
*H04B 7/06* (2006.01)
*H04W 72/04* (2009.01)

(52) U.S. Cl.
CPC ............. *H04B 7/0834* (2013.01); *H04B 7/06* (2013.01); *H04B 7/086* (2013.01); *H04W 72/046* (2013.01)

(58) Field of Classification Search
CPC ........ H04B 7/0834; H04B 7/06; H04B 7/086; H04W 72/046
See application file for complete search history.

(56) References Cited

U.S. PATENT DOCUMENTS

| 8,027,367 B2 * | 9/2011 | Li ................... H04L 1/0068 370/500 |
| 9,425,880 B2 * | 8/2016 | Kim .................. H04L 27/2628 |

(Continued)

FOREIGN PATENT DOCUMENTS

| JP | 3-428850 | 5/2003 |
| JP | 2005-075518 | 3/2005 |

(Continued)

OTHER PUBLICATIONS

PCT/ISA/210 Search Report issued on PCT/KR2018/016442, dated Mar. 25, 2019, pp. 5.

(Continued)

*Primary Examiner* — James M Perez
(74) *Attorney, Agent, or Firm* — The Farrell Law Firm, P.C.

(57) ABSTRACT

The present disclosure relates to a communication technique for fusing, with an IoT technology, a 5G communication system for supporting a higher data transmission rate than a 4G system, and a system therefor. The present disclosure may be applied to intelligent services, such as smart homes, smart buildings, smart cities, smart cars or connected cars, health care, digital education, retailing, and security and safety related services, on the basis of 5G communication technologies and IoT-related technologies. Disclosed are a method and an apparatus for communication between a transmission end and a receiving end in a communication environment to which analog beamforming is applied.

15 Claims, 19 Drawing Sheets

(56) References Cited

U.S. PATENT DOCUMENTS

| | | | |
|---|---|---|---|
| 9,614,596 B2* | 4/2017 | Takano | H04B 7/043 |
| 10,003,446 B2* | 6/2018 | Yu | H04B 7/0617 |
| 10,033,451 B2* | 7/2018 | Cho | H04B 7/0802 |
| 10,327,156 B2* | 6/2019 | Byun | H04W 72/048 |
| 10,356,633 B1* | 7/2019 | Ross | H04W 40/20 |
| 10,405,360 B2* | 9/2019 | Cai | H04B 7/0619 |
| 10,432,288 B2* | 10/2019 | Kwak | H04B 7/065 |
| 10,484,885 B2* | 11/2019 | Kim | G01S 5/0054 |
| 10,499,399 B2* | 12/2019 | Liu | H04W 76/28 |
| 10,512,076 B2* | 12/2019 | Jung | H04B 7/0617 |
| 10,541,850 B2* | 1/2020 | Gao | H04L 5/0048 |
| 10,715,240 B2* | 7/2020 | Milleth | H04B 7/0695 |
| 10,892,814 B2* | 1/2021 | Solichien | H04B 17/318 |
| 10,951,371 B2* | 3/2021 | Noh | H04L 5/0064 |
| 10,997,871 B2* | 5/2021 | Parker | C12N 5/0657 |
| 11,006,304 B2* | 5/2021 | Yiu | H04B 7/0408 |
| 11,044,061 B2* | 6/2021 | Takahashi | H04L 5/0048 |
| 11,082,104 B2* | 8/2021 | Cai | G01S 5/0268 |
| 11,101,862 B2* | 8/2021 | Venugopal | H04B 7/0695 |
| 11,172,390 B2* | 11/2021 | Yokomakura | H04L 1/0026 |
| 11,172,542 B1* | 11/2021 | Kalkunte | H04W 4/44 |
| 2008/0171516 A1* | 7/2008 | Kakura | H04B 7/086 455/63.4 |
| 2010/0150056 A1* | 6/2010 | Iwai | H04W 74/0866 370/328 |
| 2010/0165914 A1* | 7/2010 | Cho | H04B 7/0697 370/328 |
| 2010/0265924 A1* | 10/2010 | Yong | H04B 7/0695 375/267 |
| 2010/0279628 A1* | 11/2010 | Love | H04L 5/0091 455/70 |
| 2011/0064033 A1* | 3/2011 | Gong | H04B 7/088 370/329 |
| 2013/0229307 A1* | 9/2013 | Chang | H01Q 25/00 342/372 |
| 2015/0230263 A1* | 8/2015 | Roy | H04B 7/0695 455/452.2 |
| 2016/0095102 A1* | 3/2016 | Yu | H04B 7/0408 455/452.2 |
| 2016/0204507 A1 | 7/2016 | Karjalanen | |
| 2017/0111852 A1* | 4/2017 | Sélen | H04W 48/16 |
| 2017/0331577 A1* | 11/2017 | Parkvall | H04W 8/18 |
| 2018/0219604 A1* | 8/2018 | Lu | H04L 1/1607 |
| 2018/0279145 A1* | 9/2018 | Jung | H04L 5/0051 |
| 2018/0287682 A1* | 10/2018 | Kwak | H04W 24/10 |
| 2018/0287860 A1* | 10/2018 | Xia | H04L 41/0654 |
| 2018/0324853 A1* | 11/2018 | Jeon | H04W 52/04 |
| 2018/0357927 A1* | 12/2018 | Parker | C12M 41/46 |
| 2019/0052377 A1* | 2/2019 | Hwang | H04L 5/0035 |
| 2019/0068268 A1* | 2/2019 | Zhang | H04L 1/1812 |
| 2019/0074891 A1* | 3/2019 | Kwon | H04L 5/0053 |
| 2019/0089447 A1* | 3/2019 | Sang | H04W 76/19 |
| 2019/0159054 A1* | 5/2019 | Yiu | H04W 36/08 |
| 2019/0238202 A1* | 8/2019 | Chavva | H04B 7/0408 |
| 2020/0204288 A1* | 6/2020 | Zhou | H04L 1/0003 |
| 2020/0221319 A1* | 7/2020 | Kang | H04W 72/046 |
| 2020/0344834 A1* | 10/2020 | Harada | H04W 76/38 |
| 2020/0389350 A1* | 12/2020 | Harada | H04L 41/0654 |
| 2020/0404644 A1* | 12/2020 | Zhu | H04W 72/048 |
| 2021/0099224 A1* | 4/2021 | Yeo | H04B 7/088 |
| 2021/0136768 A1* | 5/2021 | Kang | H04B 7/0404 |
| 2022/0046679 A1* | 2/2022 | Yeo | H04W 72/042 |

FOREIGN PATENT DOCUMENTS

| | | |
|---|---|---|
| KR | 1020160086291 | 7/2016 |
| KR | 1020180047891 | 5/2018 |
| WO | WO2017024516 | 2/2017 |
| WO | WO2017196491 | 11/2017 |

OTHER PUBLICATIONS

PCT/ISA/237 Written Opinion issued on PCT/KR2018/016442, dated Mar. 25, 2019, pp. 5.

Huawei, HiSilicon, "Relationship between beam failure recovery and RLF", 3GPP TSG RAN WG1 Meeting #90, R1-1714334, Prague, Czech Republic, Aug. 12, 2017, pp. 7.

Korean Office Action dated May 30, 2022 issued in counterpart application No. 10-2017-0177108, 7 pages.

* cited by examiner

METHOD AND APPARATUS FOR ANTENNA BEAM TRACKING IN WIRELESS CELLULAR COMMUNICATION SYSTEM

PRIORITY

This application is a National Phase Entry of PCT International Application No. PCT/KR2018/016442 which was filed on Dec. 21, 2018, and claims priority to Korean Patent Application No. 10-2017-0177108, which was filed on Dec. 21, 2017, the content of each of which is incorporated herein by reference.

TECHNICAL FIELD

The disclosure relates to a wireless communication system, and relates to a method for tracking and changing an antenna beam. More particularly, the disclosure provides a method and apparatus in which a terminal transmits information on a location and speed to a base station, and the base station changes a beam using the information.

BACKGROUND ART

To meet the demand for wireless data traffic which has increased since the commercialization of 4G communication systems, efforts have been made to develop an improved 5G communication system or a pre-5G communication system. Therefore, the 5G communication system or the pre-5G communication system is called a "beyond 4G network communication system" or a "post-LTE system".

In order to achieve higher data rates, the 5G communication system is considered to be implemented in super-high frequency (mmWave) bands (e.g., such as a band of 60 GHz). In order to mitigate a path loss of radio waves and increase the transmission distance of the radio waves, techniques in super-high frequency bands, such as beamforming, massive multiple-input multiple-output (MIMO), full dimensional MIMO (FD-MIMO), array antennas, analog beamforming, and large scale antennas, are being discussed in 5G communication systems.

In addition, to improve the network of the system, technologies such as evolved small cells, advanced small cells, cloud radio access networks (cloud RANs), ultra-dense networks, device-to-device (D2D) communication, wireless backhaul, moving networks, cooperative communication, coordinated multi-points (CoMP), reception-end interference cancellation, and the like are being developed in the 5G communication systems.

Furthermore, in the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology are being developed.

Meanwhile, the Internet, which is a human centered connectivity network where humans generate and consume information, is now evolving to the Internet of Things (IoT) where distributed entities, such as things, exchange and process information. The Internet of Everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, techniques for connecting things, such as a sensor network, machine-to-machine (M2M) communication, machine type communication (MTC), and the like, have been recently researched. An IoT environment may provide intelligent Internet Technology (IT) services that create a new value for human life by collecting and analyzing data generated from connected things. The IoT may be applied to a variety of fields, such as smart homes, smart buildings, smart cities, smart cars or connected cars, smart grids, healthcare, smart appliances, and advanced medical services, through convergence and combination between existing Information Technology (IT) and various industries.

In line with this, various attempts have been made to apply 5G communication systems to IoT networks. For example, technologies, such as a sensor network, machine-to-machine (M2M) communication, machine type communication (MTC), and the like, are being implemented by 5G communication techniques, such as beamforming, MIMO, array antennas, and the like. Application of a cloud radio access network (RAN) as the above-described big data processing technology may also be considered as an example of convergence between the 5G technology and the IoT technology.

On the other hand, with the recent development of communication systems, a communication environment using analog beamforming between a transmitting end and a receiving end is being studied, and in particular, active discussions have been made in a communication system using a high frequency band.

DISCLOSURE OF INVENTION

Technical Problem

One feature of the 5G mobile communication system is that a transmitting/receiving terminal transmits a signal in a specific direction using analog beamforming or receives a signal from a specific direction. This can be used as a method for increasing coverage, especially in the high frequency band. The base station can amplify and transmit a signal in a specific direction instantaneously, and amplify the signal over time to change the direction of transmission to transmit a signal to a terminal in a different location.

The base station transmits a reference signal in the beam direction to find the optimal beam direction that can be transmitted to the terminal, and the terminal measures the intensity of the reference signal and transmits the measured value to the base station. The base station receives the measured value or channel state information (CSI) from the terminal, and may transmit a signal by selecting an optimal beam to the terminal based on the information.

Solution to Problem

A method of a terminal according to an embodiment of the disclosure to solve the problem includes receiving a first message for configuring information to be reported for beam selection from a base station; generating location information and movement information of the terminal on the basis of the first message; transmitting a second message including the location information and movement information to the base station; and receiving a third message including information on a transmission beam of the base station selected on the basis of the location information and movement information from the base station.

According to another embodiment to solve the problem, the location information represents the location of the terminal at a predetermined time point or represents a change in the location of the terminal during a predetermined time period, and the movement information represents information on at least one of direction, speed, acceleration, and angular acceleration of the terminal at a predetermined point in time, or at least one of a direction change, a speed change, an acceleration change, and an angular acceleration change of the terminal during a predetermined time period.

According to another embodiment to solve the problem, the method further includes detecting a beam failure during communication with the base station; and requesting a beam failure recovery (BFR) on a resource corresponding to the transmission beam of the base station.

According to another embodiment to solve the problem, the method further includes transmitting information indicating that the terminal supports the location information and movement information to the base station.

According to another embodiment to solve the problem, history information on the change of the transmission beam may be transmitted to a target base station for a handover of the terminal if the transmission beam of the base station is changed according to the movement of the terminal during communication between the base station and the terminal.

A terminal according to an embodiment of the disclosure to solve the problem includes a transceiver configured to transmit and receive a signal, and a controller configured to: receive a first message for configuring information to be reported for beam selection from a base station; generate location information and movement information of the terminal on the basis of the first message; transmit a second message including the location information and movement information to the base station; and receive a third message including information on a transmission beam of the base station selected on the basis of the location information and movement information from the base station.

A method of a base station according to an embodiment of the disclosure to solve the problem includes transmitting a first message for configuring information to be reported for beam selection to a terminal; receiving a second message including the location information and movement information generated on the basis of the first message from the terminal; selecting a transmission beam for communication with the terminal on the basis of the location information and movement information included in the second message; and transmitting a third message including information on the selected transmission beam.

A base station according to an embodiment of the disclosure to solve the problem includes a transceiver configured to transmit and receive a signal, and a controller configured to: transmit a first message for configuring information to be reported for beam selection to a terminal; receive a second message including the location information and movement information generated on the basis of the first message from the terminal; select a transmission beam for communication with the terminal on the basis of the location information and movement information included in the second message; and transmit a third message including information on the selected transmission beam.

Advantageous Effects of Invention

According to an embodiment of the disclosure, as described above, when transmitting a beam in a specific direction by using multiple antennas for transmission and reception of a terminal and a base station, the selected beam is transmitted on the basis of the location information and the movement information of the terminal so that the change of the beam can be tracked in a short time.

MODE FOR THE INVENTION

Figure 1:
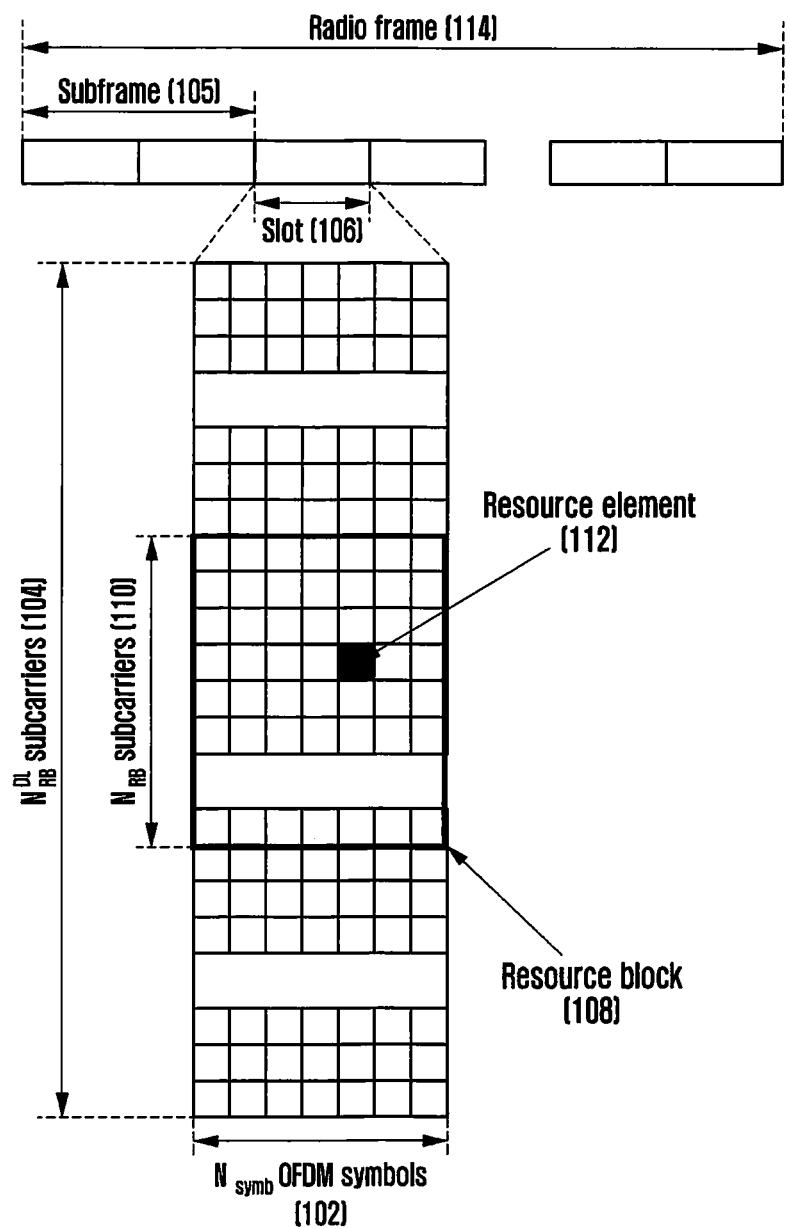
FIG. 1 is a diagram illustrating a downlink time-frequency domain transmission structure of an LTE or LTE-A system.

Hereinafter, embodiments of the disclosure will be described in detail with reference to the accompanying drawings.

In describing the embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly convey the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer-usable or computer-readable memory that can direct a computer or other programmable data processing apparatus to function in a particular manner, such that the instructions stored in the computer-usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

Also, each block may represent a module, segment, or portion of code, which includes one or more executable instructions for implementing the specified logical function (s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a field programmable gate array (FPGA) or an application specific integrated circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or divided into a larger number of elements. Moreover, the elements and "units" may be implemented to reproduce one or more CPUs within a device or a security multimedia card. Also, in an embodiment, "unit" may include one or more processors.

The wireless communication system, apart from providing early voice-based services, is advancing to a broadband wireless communication system for providing high-speed and high-quality packet data services using communication standards, such as high-speed packet access (HSPA) of 3GPP, long-term evolution LTE or evolved universal terrestrial radio access (E-UTRA), LTE-advanced (LTE-A), high-rate packet data (HRPD) of 3GPP2, ultra-mobile broadband (UMB), IEEE 802.16e, and the like. In addition, 5G or new radio (NR) communication standards are being established as the 5th generation wireless communication systems.

As representative examples of the wideband wireless communication system, an LTE system adopts an orthogonal frequency division multiplexing (OFDM) scheme in a downlink (DL) and a single carrier frequency division multiple access (SC-FDMA) scheme is adopted in an uplink (UL). Uplink refers to a radio link through which a terminal (user equipment (UE) or a mobile station (MS)) transmits data or control signals to a base station (eNode B, or base station (BS)), and the downlink refers to a radio link through which the base station transmits data or control signals to the terminal. In the multiple access method as described above, data or control information of each user is classified by assigning and operating such that time-frequency resources to be loaded with data or control information for each user do not overlap with each other, that is, orthogonality is established.

The LTE system adopts a hybrid automatic repeat reQuest (HARQ) method that retransmits the corresponding data in the physical layer when a decoding failure occurs in the initial transmission. In the HARQ method, when a receiver fails to correctly decode (decode) data, the receiver transmits information (negative acknowledgment) (NACK) that informs the transmitter of the decoding failure, so that the transmitter can retransmit the corresponding data in the physical layer. The receiver increases data reception performance by combining data retransmitted by the transmitter with data that has previously failed decoding. In addition, when the receiver correctly decodes data, it is possible to transmit new data to the transmitter by transmitting acknowledgment (ACK) informing the transmitter of decoding success.

FIG. 1 is a diagram illustrating a basic structure of a time-frequency domain, which is a radio resource domain in which the data or control channel is transmitted in a downlink in an LTE system.

In FIG. 1, the horizontal axis represents a time domain, and the vertical axis represents a frequency domain. The minimum transmission unit in the time domain is an OFDM symbol. $N_{symb}$ OFDM symbols 102 constitute one slot 106, and two slots constitute one subframe 105. The length of the slot is 0.5 ms, and the length of the subframe is 1.0 ms. In addition, a radio frame 114 is a time domain unit including 10 subframes. The minimum transmission unit in the frequency domain is a subcarrier, and the bandwidth of the entire system transmission bandwidth includes a total of $N_{BW}$ subcarriers 104.

The basic resource unit in the time-frequency domain is a resource element (RE) 112, which may be indicated by an OFDM symbol index and a subcarrier index. A resource block (RB) 108 (or a physical resource block (PRB)) may be defined by consecutive $N_{symb}$ OFDM symbols 102 in the time domain and consecutive $N_{RB}$ subcarriers 110 in the frequency domain. Thus, one RB 108 may include $N_{symb} \times N_{RB}$ REs 112. In general, the minimum transmission unit of data is the RB unit. In the LTE system, generally $N_{symb}=7$ and $N_{RB}=12$, and $N_{BW}$ and $N_{RB}$ may be proportional to the bandwidth of a system transmission band. The data rate increases in proportion to the number of RBs scheduled to the terminal. The LTE system may define and operate six transmission bandwidths. In the case of the FDD system in which the downlink and the uplink are separated by frequency, the downlink transmission bandwidth and the uplink transmission bandwidth may be different from each other. The channel bandwidth represents an RF bandwidth corresponding to the system transmission bandwidth. Table 1 below shows a relationship between the system transmission bandwidth and the channel bandwidth defined in the LTE system. For example, an LTE system having a channel bandwidth of 10 MHz may have a transmission bandwidth including 50 RBs.

TABLE 1

| Channel bandwidth $BW_{Channel}$ [MHz] | 1.4 | 3 | 5 | 10 | 15 | 20 |
|---|---|---|---|---|---|---|
| Transmission bandwidth configuration NRB | 6 | 15 | 25 | 50 | 75 | 100 |

The downlink control information may be transmitted within the first N OFDM symbols in the subframe. In general, N={1, 2, 3}. Therefore, the value N may vary for each subframe according to the amount of control information to be transmitted in the current subframe. The control information may include a control channel transmission interval indicator indicating the number of OFDM symbols through which the control information is transmitted, scheduling information of downlink data or uplink data, HARQ ACK/NACK, and the like.

In the LTE system, scheduling information about downlink data or uplink data is transmitted from a base station to a terminal via downlink control information (DCI). The DCI defines several formats and operates by applying DCI format determined according to whether it is scheduling information about uplink data (UL grant) or scheduling information about downlink data (DL grant), whether it is a compact DCI with a small amount of control information, whether spatial multiplexing using multiple antennas is applied, or whether the DCI is intended for power control, etc. For example, DCI format 1, which is scheduling control information about downlink data (DL grant), may include at least one piece of the following control information Resource allocation type 0/1 flag: this indicates resource allocation type 0 or 1. Type 0 allocates resources by a resource block group (RBG) while applying a bitmap scheme. In the LTE system, the basic unit of scheduling is an RB represented by time and frequency domain resources, and the RBG includes a plurality of RBs and becomes a basic unit of scheduling in type 0. Type 1 allocates a specific RB in the RBG.

Resource block assignment: this indicates the RBs assigned for data transmission. The resources to be expressed are determined according to system bandwidths and resource allocation schemes.

Modulation and coding scheme (MCS): this indicates a modulation scheme used for data transmission and the size of a transport block, which is the data to be transmitted.

HARQ process number: this indicates a HARQ process number.

New data indicator: this indicates initial HARQ transmission or retransmission

Redundancy version: this indicates a redundancy version of HARQ.

Transmit power control (TPC) command for physical uplink control channel (PUCCH): this indicates a transmission power control command for a PUCCH, which is an uplink control channel.

The DCI may go through a channel coding and modulation process, and may then be transmitted via a physical downlink control channel (PDCCH) (or control information, hereinafter, the PDCCH and the control information will be interchangeably used with each other) or an enhanced PDCCH (EPDCCH) (or enhanced control information, hereinafter, the EPDCCH and the enhanced control information will be interchangeably used with each other), which is a downlink physical control channel.

In general, the DCI is scrambled with a specific radio network temporary identifier (RNTI) (or a terminal identifier) independently for each terminal so that cyclic redundancy check (CRC) is added, is channel-coded, and is configured as an independent PDCCH to then be transmitted. In the time domain, the PDCCH is mapped and transmitted during a control channel transmission interval. The frequency domain mapping position of the PDCCH may be determined by an identifier (ID) of each terminal, and may be distributed overall system transmission bands.

The downlink data may be transmitted through a physical downlink shared channel (PDSCH), which is a physical channel for downlink data transmission. The PDSCH may be transmitted after the control channel transmission interval, and scheduling information, such as a specific mapping position in the frequency domain, the modulation scheme, and the like, is informed by the DCI transmitted via the PDCCH.

The base station notifies the terminal of the modulation scheme applied to the PDSCH to be transmitted to the terminal and the size of data (transport block size (TBS)) to be transmitted through the MCS consisting of 5 bits, among the control information constituting the DCI. The TBS corresponds to the size before channel coding for error correction is applied to the data (i.e., transport block (TB)) to be transmitted by the base station.

The modulation schemes supported by the LTE system are quadrature phase shift keying (QPSK), 16 quadrature amplitude modulation (16QAM), and 64QAM, and their modulation orders (Qm) correspond to 2, 4, and 6, respectively. That is, 2 bits per symbol can be transmitted in the QPSK modulation; 4 bits per symbol can be transmitted in the 16QAM; and 6 bits per symbol can be transmitted in the 64QAM.

Figure 2:
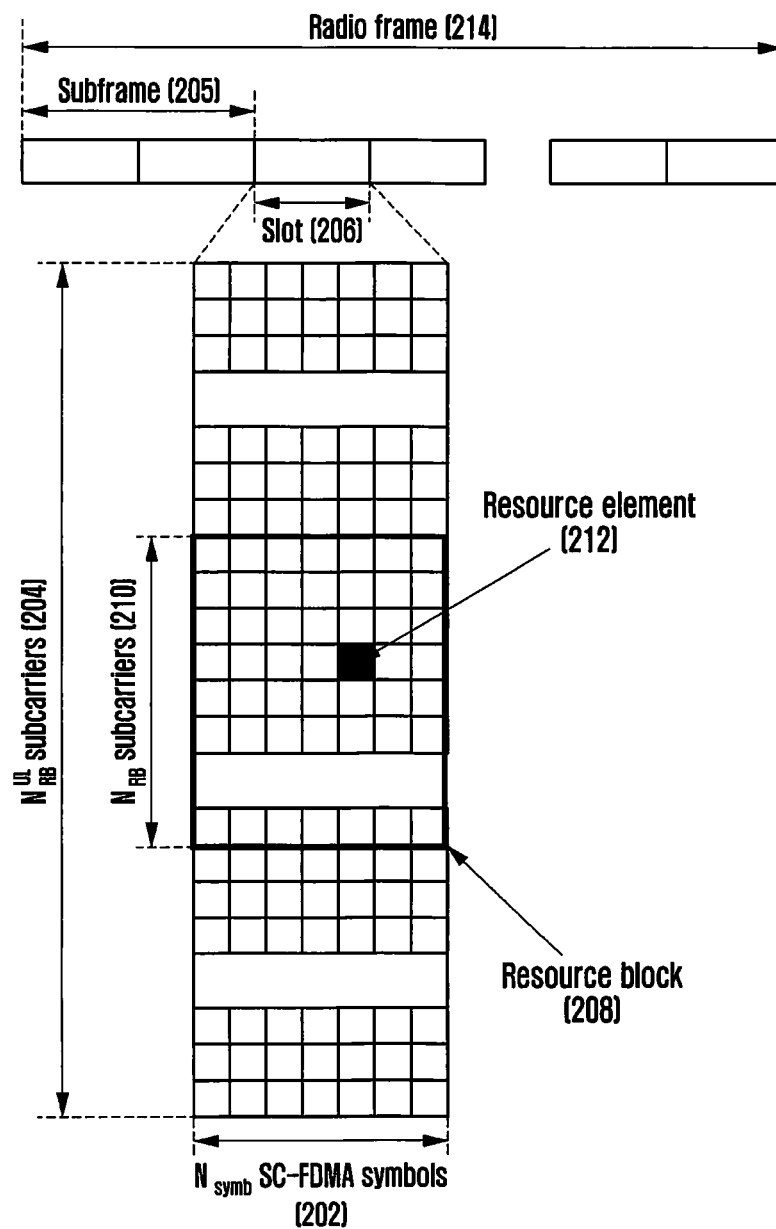
FIG. 2 is a diagram illustrating an uplink time-frequency domain transmission structure of an LTE or LTE-A system.

FIG. 2 is a diagram illustrating a basic structure of a time-frequency domain, which is a radio resource domain for transmitting data or control channel in an uplink in an LTE-A system according to the prior art.

Referring to FIG. 2, the horizontal axis represents a time domain, and the vertical axis represents a frequency domain. The minimum transmission unit in the time domain is an SC-FDMA symbol 202, and $N_{symb}^{UL}$ SC-FDMA symbols may constitute one slot 206. In addition, two slots constitute one subframe 205. The minimum transmission unit in the frequency domain is a subcarrier, and the entire system transmission bandwidth 204 includes a total of $N_{BW}$ subcarriers. New may have a value proportional to the system transmission band.

The basic unit of a resource in the time-frequency domain is a resource element (RE) 212, which may be defined by an SC-FDMA symbol index and a subcarrier index. A resource block (RB) pair 208 may be defined by consecutive $N_{symb}^{UL}$ SC-FDMA symbols in the time domain and consecutive $N_{SC}^{RB}$ subcarriers in the frequency domain. Thus, one RB includes $N_{symb}^{UL} \times N_{SC}^{RB}$ REs. In general, the minimum transmission unit of data or control information is an RB. The PUCCH is mapped with a frequency domain corresponding to 1 RB and is transmitted for 1 subframe.

In the LTE system, a timing relationship of a PDSCH, which is a physical channel for downlink data transmission, or a PUCCH or PUSCH, which is an uplink physical channel through which HARQ ACK/NACK corresponding to a PDCCH/EPDDCH including semi-persistent scheduling release (SPS release) is transmitted, has been defined. For example, in the LTE system operating in frequency division duplex (FDD), the HARQ ACK/NACK corresponding to a PDCCH/EPDCCH including the PDSCH or SPS release transmitted in the (n−4)$^{th}$ subframe may be transmitted through a PUCCH or a PUSCH in the n$^{th}$ subframe.

In the LTE system, the downlink HARQ employs an asynchronous HARQ scheme in which the data retransmission time point is not fixed. That is, when HARQ NACK is received as feedback from the terminal in response to the initial transmission data transmitted by the base station, the base station freely determines the transmission time point of the retransmission data by scheduling operation. The terminal performs buffering on the data determined to be an error as a result of decoding the received data for HARQ operation, and performs combining with the next retransmission data.

Figure 3:
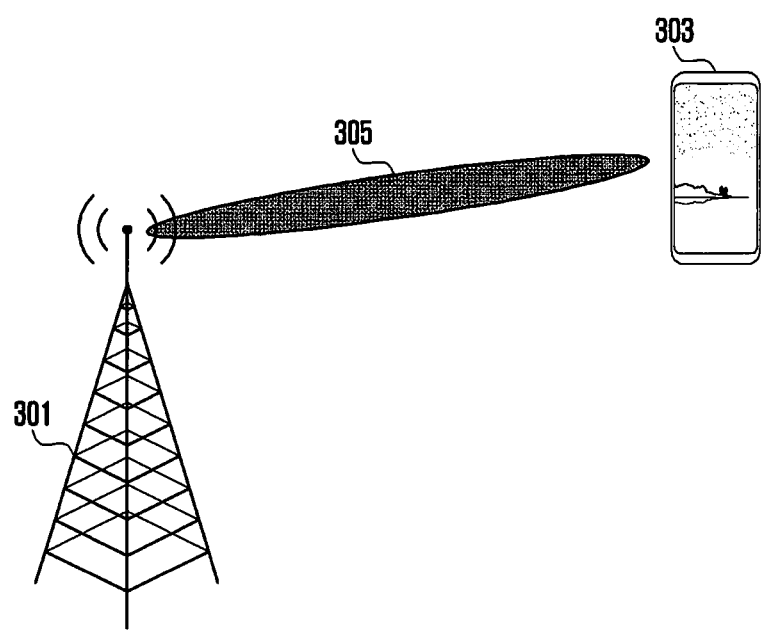
FIG. 3 is a diagram illustrating beamforming in which a signal is concentrated and transmitted in a direction of a terminal when a signal is transmitted from a base station to the terminal.

A signal strength can be amplified by applying a beamforming technique in which a base station and a terminal transmit signals in a specific direction during transmission and reception. The beamforming may be classified into digital beamforming performed by applying precoding at a digital stage, and analog beamforming performed by adjusting a transmission direction of an antenna. The analog beamforming using the characteristics of an antenna is a method of physically concentrating and transmitting a signal in a specific direction. FIG. 3 is a diagram illustrating beamforming in which a signal is concentrated and transmitted in a direction of a terminal when a signal is transmitted from a base station to the terminal. A base station 301 concentrates the signal in the terminal direction 305 using digital beamforming or analog beamforming and transmits control and data signals to a terminal 303. It is possible to obtain an effect of increasing the received signal-to-noise ratio at the terminal 303 over that of when the beamforming is not used, and it is possible to reduce interference signals to other terminals. The base station forms a beam in various directions and transmits it to the terminal in order to know the direction of the terminal, and the terminal determines the beam with the strongest signal among the beams transmitted in various directions and transmits the corresponding beam information to the base station. The beam information may include a beam index number, etc. The base station may transmit control and data signals to the corresponding beam from the subsequent transmission using the beam information received from the terminal.

Figure 4:
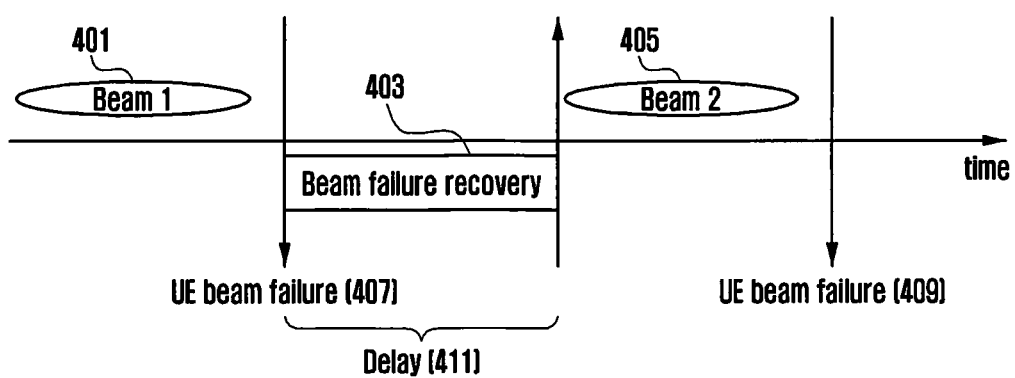
FIG. 4 is a diagram illustrating a process of changing a beam direction of a signal transmitted from a base station to a terminal.

FIG. 4 is a diagram illustrating a process of changing a beam direction of a signal transmitted from a base station to a terminal. When the base station is transmitting a signal to the terminal through beam 1 401, a situation in which transmission through the beam 1 is not successful may occur due to a movement of the terminal or a rapid change in a channel (407). This may be referred to as a beam failure (407), and in the case of the beam failure, a beam failure recovery (403) operation is required. The beam failure recovery may be a process of finding a new optimal beam or a beam capable of successfully transmitting a signal from the base station to the terminal (403). In the beam failure recovery step, the base station may transmit beams in various directions to the terminal, and the channel state measured using the beams in the various directions may be reported by the terminal, or beam information in a direction having the greatest intensity may be reported by the terminal. A delay of a certain time may occur to perform the beam failure recovery step (411). It is possible for the base station to transmit a signal to the terminal using the new beam 2 405 selected through the beam failure recovery 403 process, and a beam failure may appear after this process (409).

Figure 5:
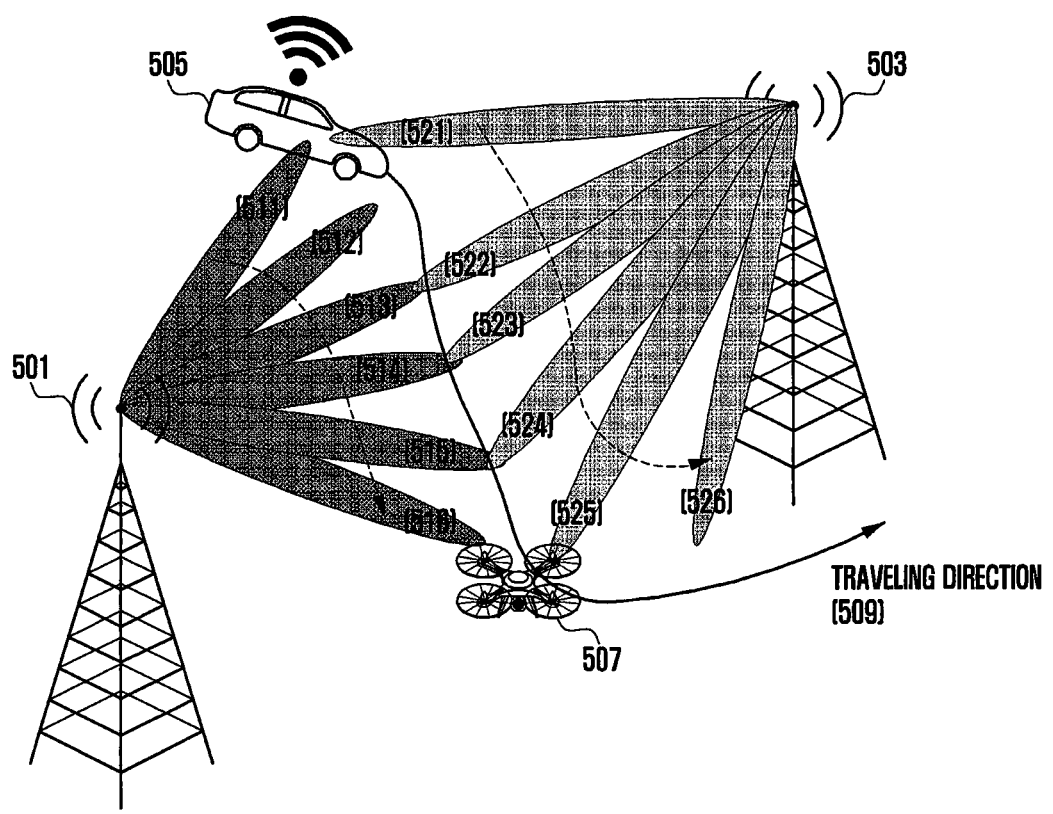
FIG. 5 is a diagram illustrating that an optimal beam direction changes from a base station as a terminal moves.

FIG. 5 is a diagram illustrating that an optimal beam direction changes from a base station as a terminal moves. A terminal 505 and a terminal 507 may transmit and receive a signal from base stations 501 and 503, respectively, while moving. For example, as the terminal 505 moves, a beam 511 is initially selected and used for signal transmission and reception, and as the terminal 505 moves, another beam 512 may be selected as an optimal beam. Through this process, beams 511, 512, 513, 514, 515, and 516 may be sequentially selected and used for signal transmission and reception according to the mobile path of the terminal, and the beam failure and the beam failure recovery steps described in FIG. 4 may be continuously required for the frequent change of the beam.

On the other hand, as described above, since the beam failure and the beam failure recovery process take a certain period of time, frequent beam changes lead to a longer time during which communication may be disconnected. Therefore, a method for solving such a problem is required. The disclosure provides a method and apparatus for transmitting and receiving control and data signals by selecting a beam direction on the basis of the position and movement of the terminal, as well as feedback from the terminal.

In the following drawings, a car and a drone are described as an example of a terminal, but this is only an example for convenience of description, and the embodiments described below may correspond to all terminals capable of communicating with a base station.

On the other hand, the method provided below will describe the operation between the base station and the terminal, but it can also be applied to communication between terminals. In this case, one terminal may serve as a base station in the following embodiments, and the other terminal may be applied in a manner that serves as a terminal in the following embodiments.

First Embodiment

The first embodiment provides a method and apparatus for a terminal to transmit information such as its location, speed, acceleration, and measurement time to a base station. Hereinafter, the location information may include information indicating the location of the terminal at a specific time point or during time period, and the movement information may include information representing a moving speed, acceleration, angular acceleration, etc. of the terminal measured during a specific time point or time period. In addition, the location information may include information on a time point or time period in which location information is generated, and the movement information may also include information on a time point or time period at which movement information is generated.

Figure 6:
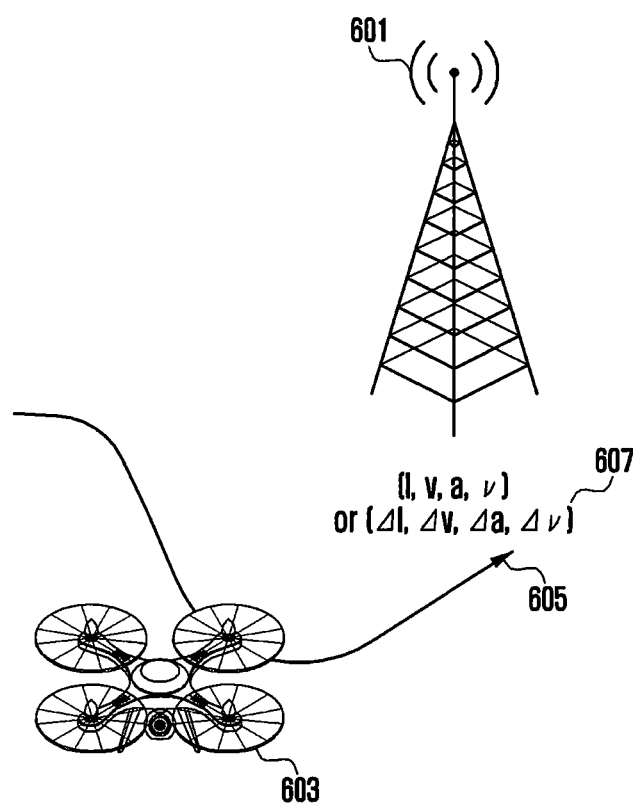
FIG. 6 is a diagram illustrating that a terminal reports information such as a location to a base station, according to a first embodiment of the disclosure.

FIG. 6 is a diagram illustrating a process of reporting at least one of location information and movement information to a base station as a terminal moves. When transmitting and receiving a signal from the base station 601, the terminal 603 reports to the base station information 607 about at least one of the position, speed, acceleration, angular acceleration or position change, speed change, acceleration change, and angular acceleration change. The terminal may periodically or aperiodically report the information to the base station according to its own movement path 605, so that the base station can select an optimal beam direction when transmitting and receiving a signal with the corresponding terminal.

Meanwhile, according to an embodiment, the location information (for example, the position or the amount of position change) of the terminal 603 may be expressed in 2D coordinates or 3D coordinates. As illustrated in FIG. 6, when the terminal 603 moves and the height can be changed in space, the location information may include 3D coordinates. Needless to say, even if the height does not change in space according to the movement of the terminal 603, 3D coordinates may be used instead of 2D coordinates.

Figure 7:
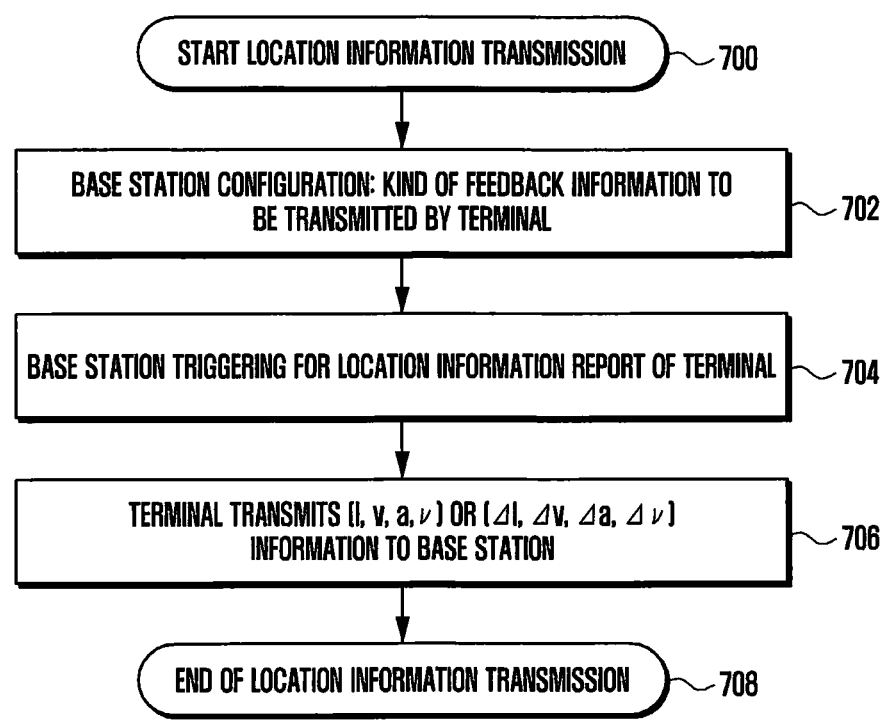
FIG. 7 is a flowchart illustrating a procedure in which a terminal reports the information to a base station, according to a first embodiment of the disclosure.

FIG. 7 is a flowchart illustrating a procedure in which a terminal reports the above-described location information and movement information to a base station. Although not explicitly illustrated in FIG. 7, an exchange process of a capability of a terminal to report location information and movement information to a base station may be performed first. That is, a process may be performed in which the terminal informs the base station of the capability of reporting location information and movement information, and the base station confirms and then responds to the same, or a process may be performed in which the base station inquires whether the terminal can report location information and movement information, and the terminal reports the capability in response. When the terminal transmits information indicating that it supports location information and/or movement information to the base station (that is, when the terminal is a terminal having capability), the base station may configure feedback information, to be described later, of the terminal.

Subsequently, the base station configures and transmits feedback information to be transmitted by the terminal, to the terminal (702). The configuration may be transmitted via upper level signaling, and may be a process of notifying the terminal of information on at least one of location information and movement information of the terminal. For example, the base station may configure at least one of the position, speed, acceleration, angular acceleration or position change amount, speed change amount, acceleration change amount, and angular acceleration change amount of the terminal. Then, the base station may transmit triggering to notify the terminal of the information configured in the terminal (704). The triggering may be delivered via L1 signaling or MAC CE, and RRC signaling can be used for periodic reporting. If the triggering condition received from the base station is satisfied, the terminal may transmit information on at least one of the location information and the movement information configured in 702 or a change amount thereof to the base station (706). The terminal may transmit location information, location change amount information, movement information, and movement change amount information to a base station together with information on a time point or time period of the corresponding information. In operation 706, the terminal may transfer at least one of the movement information and the location information to the base station using one or more combinations of L1 signaling, MAC CE, and RRC signaling.

Second Embodiment

Figure 8:
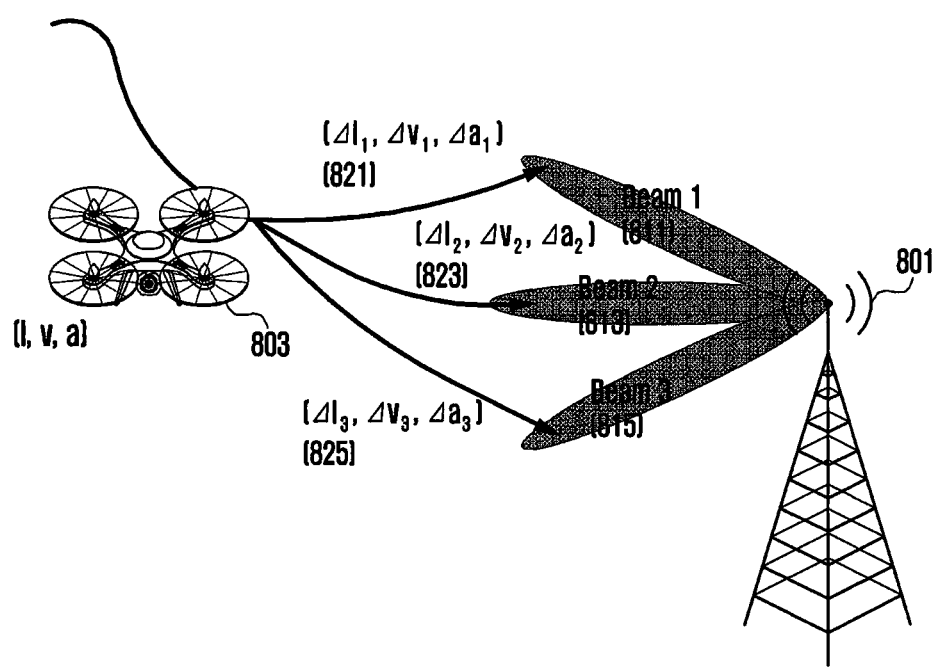
FIG. 8 is a diagram illustrating that a base station selects a different transmission/reception beam on the basis of information reported by a terminal, according to a second embodiment of the disclosure.

The second embodiment provides a method and apparatus for the base station 801 to receive location information and movement information (that is, information such as position, speed, acceleration, measurement time, etc.) from the terminal 803, and to determine an optimal transmission/reception beam direction to the terminal. FIG. 8 is a diagram illustrating that a base station selects a different transmission/reception beam on the basis of information reported by a terminal. The terminal 803 transmits information 821, 823, 825, such as position, speed, acceleration, or the amount of change to the base station based on its current position or a predicted position in the future. The base station may select a transmission/reception beam according to the reported information of the terminal. For example, if the information reported by the terminal is 821, the expected location and movement path of the terminal will be in the direction of 821, and the base station may select the optimal beam 1 811 in the corresponding direction and use the same for transmission and reception. In addition, if the information reported by the terminal is 823, the expected location and movement path of the terminal will be in the 823 direction, and the base station may select the optimal beam 2 813 in the corresponding direction and use the same for transmission and reception. In addition, when the information reported by the terminal is 825, the expected location and movement path of the terminal will be in the direction of 825, and the base station may select and use the optimal beam 3 815 in the corresponding direction and use the same for transmission and reception. The relationship between the moving path and the specific transmission/reception beam may be stored in the base station in advance, and the base station may select the optimal transmission/reception beam for the terminal on the basis of the location information and the movement information dynamically received from the terminal.

Figure 9:
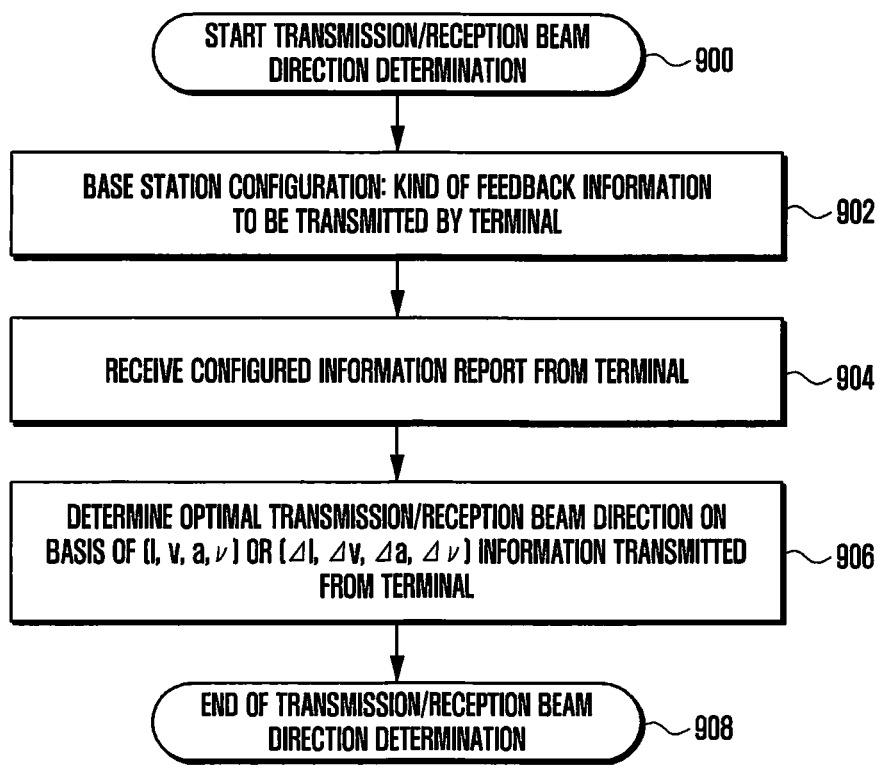
FIG. 9 is a flowchart illustrating a process in which a base station receives information such as a location from a terminal, determines an optimal transmission/reception beam direction on the basis of the information, and transmits/receives a signal using the determined beam, according to a second embodiment of the disclosure.

FIG. 9 is a flowchart illustrating a process in which a base station receives location information and movement information from a terminal, determines an optimal transmission/reception beam direction on the basis of the information, and transmits/receives a signal using the determined beam. The base station configures the type of information that the terminal should report, to the terminal as upper signaling (902). The type of the information may be at least one of location information and movement information. The terminal reports movement information and location information to the base station according to the procedure described in FIG. 7, and the base station receives the configured information from the terminal (904). The base station may determine an optimal beam direction to the corresponding terminal on the basis of the reported information (906). In this case, the base station may select the optimal beam for the terminal at the current time based on the location information and the movement information reported by the terminal, and may select the optimal beam expected according to the movement path of the terminal in consideration of the location information and the movement information reported by the terminal.

Third Embodiment

The third embodiment describes an embodiment in which the terminal receives location information and movement information of the base station from the base station, and the terminal determines its own transmission/reception beam. According to the third embodiment, the terminal may measure its own location information, such as its position, speed, and acceleration, and movement information, and then may determine the direction of the transmission/reception beams of the terminal in consideration of its location information and movement information together with location information and movement information of the base station received from the base station. In the above, the location information and the movement information of the base station that the terminal receives from the base station may include information on the location of the base station, the speed of the base station, the acceleration of the base station, the measurement time point or the time period of the location information and the movement information. This may be a case in which the base station moves. That is, in the case of a mobile base station that is not a fixed base station, the above-described embodiments may be applied together in addition to the contents of the first and second embodiments.

Figure 10:
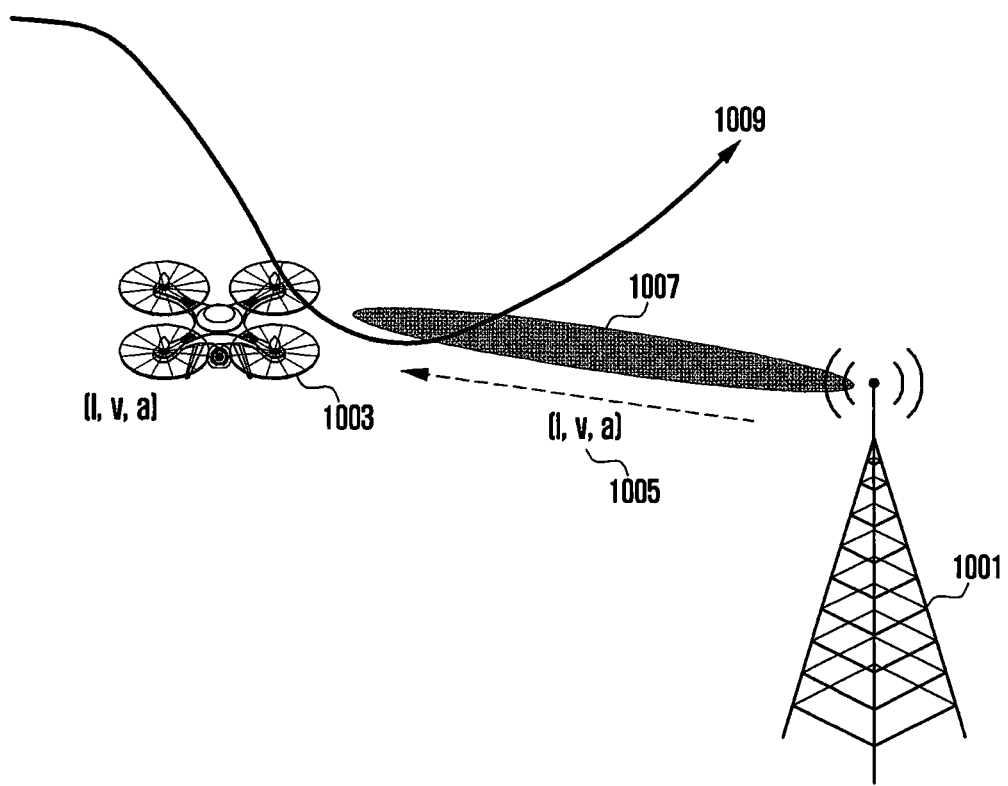
FIG. 10 is a diagram illustrating that a terminal determines a direction of a transmission beam and a reception beam on the basis of information such as location, speed, and acceleration of a base station in determining directions of a transmission beam and a reception beam, according to a third embodiment of the disclosure.

In FIG. 10, in determining the direction of its own transmission beam and reception beam as the terminal 1003 moves, the terminal 1003 may receive location information such as the position, speed, and acceleration of the base station 1001 together with movement information 1005 from the base station 1001, and determine the direction of its own transmission beam and reception beam (1007) on the basis of the information. In FIG. 10, the base station 1001 is depicted as a fixed base station, but the embodiment is not limited to a fixed base station and may be similarly applied to a base station in which a mobile base station is installed in an airship, drone, airplane, vehicle, or the like. Accordingly, when the base station moves, the mobile information of the base station is transmitted to the terminal, and the terminal can use the mobile information 1005 of the base station to determine the beam. The terminal can continuously change the transmission/reception beam direction 1007 with the base station while moving in the 1009 direction, and the terminal may determine the optimal transmission/reception beam in the direction of the base station by using information such as the location, speed, and acceleration of the base station in determining its own transmission/reception beam direction change.

In the embodiment, when the terminal determines the direction of the transmission/reception beam, the terminal may determine the direction of the transmission/reception beam on the basis of not only the information of the base station received from the base station, but also its own movement information and location information measured by the terminal as described in the first and second embodiments.

Fourth Embodiment

In the fourth embodiment, a method of utilizing location and movement information of a terminal and a base station when performing beam failure recovery (BFR) in case that beam tracking of the terminal fails is described.

Figure 13:
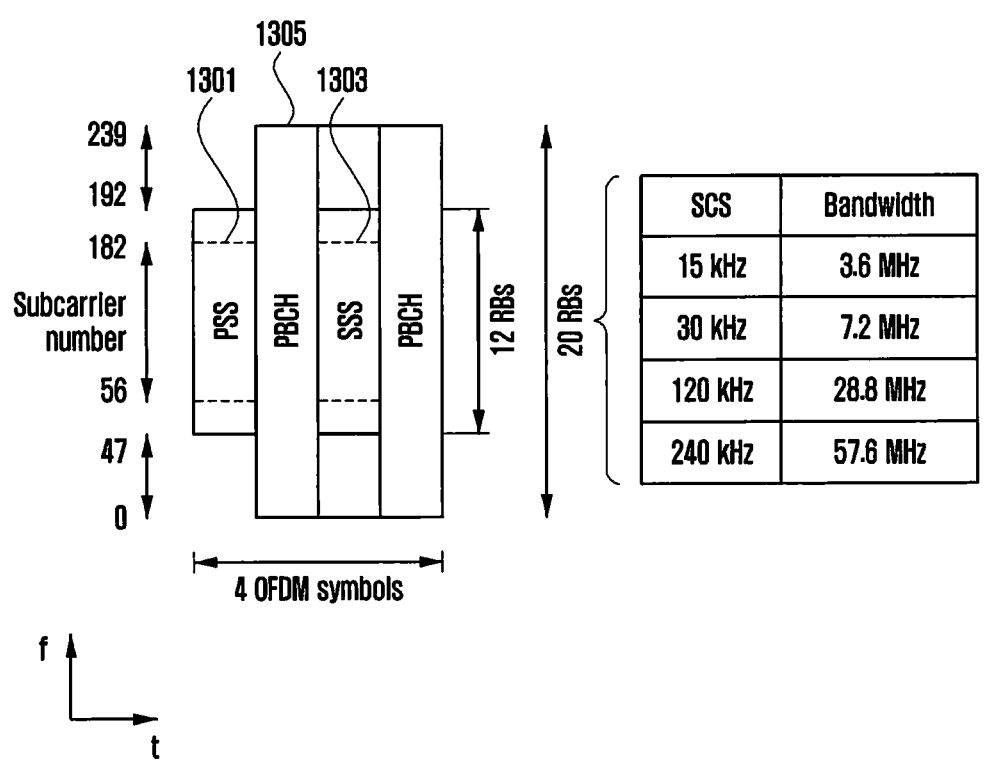
FIG. 13 is a diagram illustrating a synchronization signal block (SSB) related to an embodiment of the disclosure.

FIG. 13 is a diagram illustrating a synchronization signal block (SSB) related to an embodiment of the disclosure, and illustrates that synchronization signals of the 3GPP NR system and a physical broadcast channel (PBCH 1305) are mapped to a frequency and time resource domain. The primary synchronization signal (PSS 1301), the secondary synchronization signal (SSS 1303), and the PBCH are mapped to 4 OFDM symbols, the PSS and SSS are mapped to 12 RBs, and the PBCH is mapped to 20 RBs. Changes in the frequency band of 20 RBs according to the subcarrier spacing (SCS) is shown on the right side of FIG. 13. The resource region through which the PSS, SSS, and PBCH are transmitted may be referred to as an SS/PBCH block (SS block or SSB).

Figure 14:
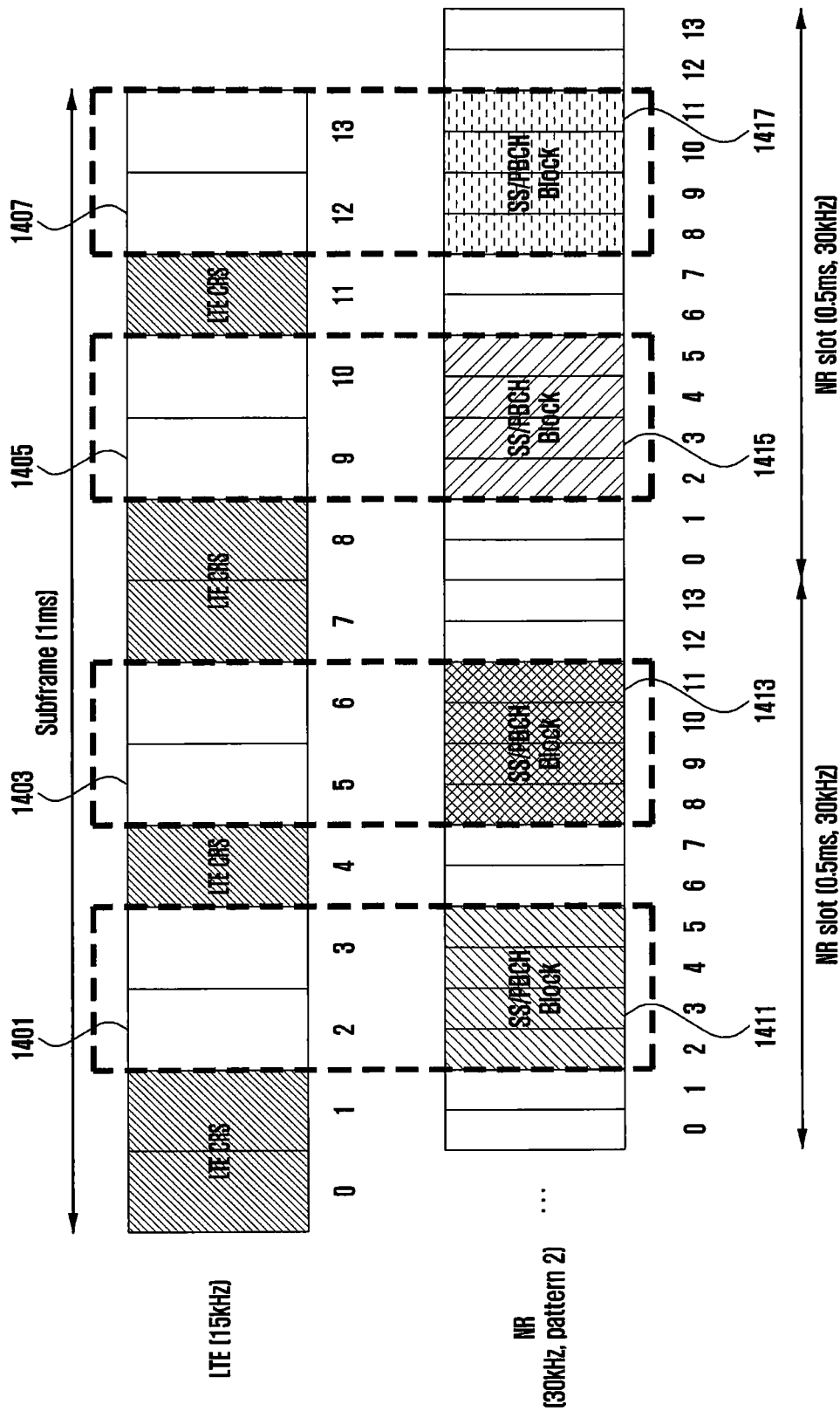
FIG. 14 is a diagram illustrating an example in which an SSB is mapped in a slot in relation to an embodiment of the disclosure.

FIG. 14 is a diagram illustrating an example in which an SSB is mapped in a slot in relation to an embodiment of the disclosure, and is a diagram illustrating which symbols are mapped to one SS/PBCH block in a slot. FIG. 14 shows an example of an LTE system using a subcarrier spacing of 15 kHz and an NR system using a subcarrier spacing of 30 kHz, and the systems being designed such that SS/PBCH blocks 1411, 1413, 1415, 1417 of the NR system are transmitted at positions 1401, 1403, 1405, 1407 which can avoid cell-specific reference signals (CRSs) that are always transmitted in the LTE system. This may allow the LTE system and the NR system to coexist in one frequency band.

The base station may transmit the SS/PBCH block by changing the direction of the transmission beam every time the SS/PBCH block is transmitted, and the terminal may measure the reference signal received power (RSRP) based on the SS/PBCH block to evaluate the reception performance of a specific beam (i.e., beams in which the base station has transmitted the corresponding SS/PBCH block). RSRP may be a linear average value of power received by a reference signal from a resource element (RE) to which a specific reference signal is mapped and transmitted, and may be expressed in a unit of watts. For example, a secondary synchronization signal or a channel state information reference signal (CSI-RS), etc. may be a reference signal for RSRP measurement. The terminal may report the result of measuring the SS/PBCH block to the base station, and when receiving control information (PDCCH: Physical Downlink Control Channel) or data (PDSCH: Physical Downlink Shared Channel), information of a base station transmission beam may be known from information indicating which SS/PBCH block the received signal is associated with.

Figure 15:
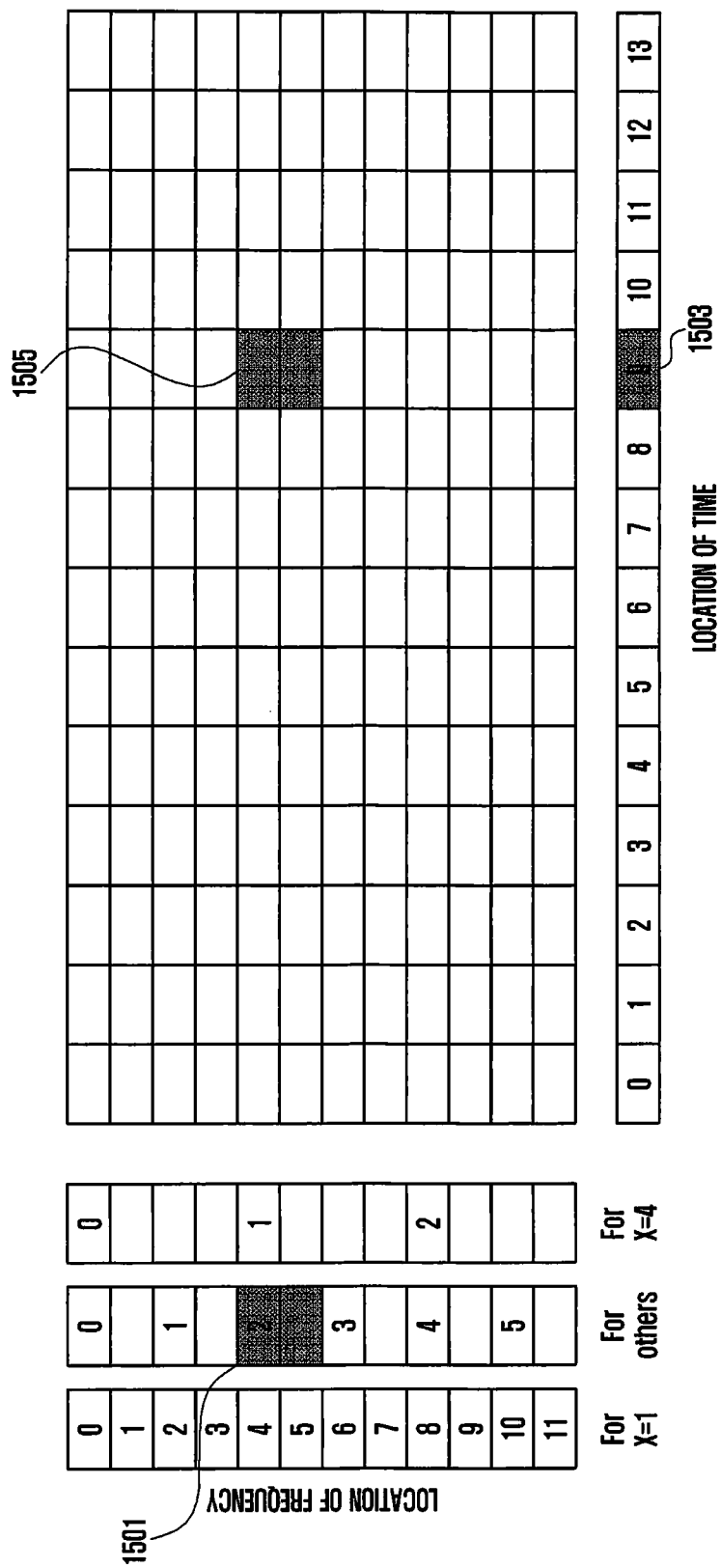
FIG. 15 is a diagram illustrating an example of configuring a channel state information reference signal (CSI-RS) in relation to an embodiment of the disclosure.

FIG. 15 is a diagram illustrating an example of configuring a channel state information reference signal (CSI-RS) in relation to an embodiment of the disclosure, and illustrates an example of the CSI-RS that can be used in the 3GPP NR system. When a base station delivers a frequency subcarrier location 1501 to which CSI-RS is mapped in one physical resource block (PRB) and a symbol location 1503 to which CSI-RS is mapped in one slot to a terminal, the resource location of the CSI-RS transmitted by the base station is determined (1505). The base station may transmit information on whether the transmission beam is changed or maintained between the CSI-RS resource sets set through upper signaling to the terminal. Accordingly, the terminal may determine the RSRP according to the combination of the transmission beam and the reception beam by measuring the CSI-RS.

According to one embodiment, in the process in which the base station configures the CSI-RS to the terminal and transmits the CSI-RS accordingly, the base station may determine the transmission beam of the CSI-RS on the basis of the location information and the movement information of the base station and the location information and the movement information of the terminal, and the terminal may determine the reception beam of the CSI-RS. For example, if the directions of the transmission beam and the reception beam after t1 time and the transmission beam and the reception beam after t2 time are calculated based on the location information and movement information of the base station and the location information and movement information of the terminal, the calculated directions may be used to determine a transmission beam and a reception beam of CSI-RS transmitted after t1 time and to determine a transmission beam and a reception beam of CSI-RS transmitted after t2 time according to the determined result. The units of time t1 and t2 may be variously changed to msec, usec, nsec, sec, and the like.

Figure 16:
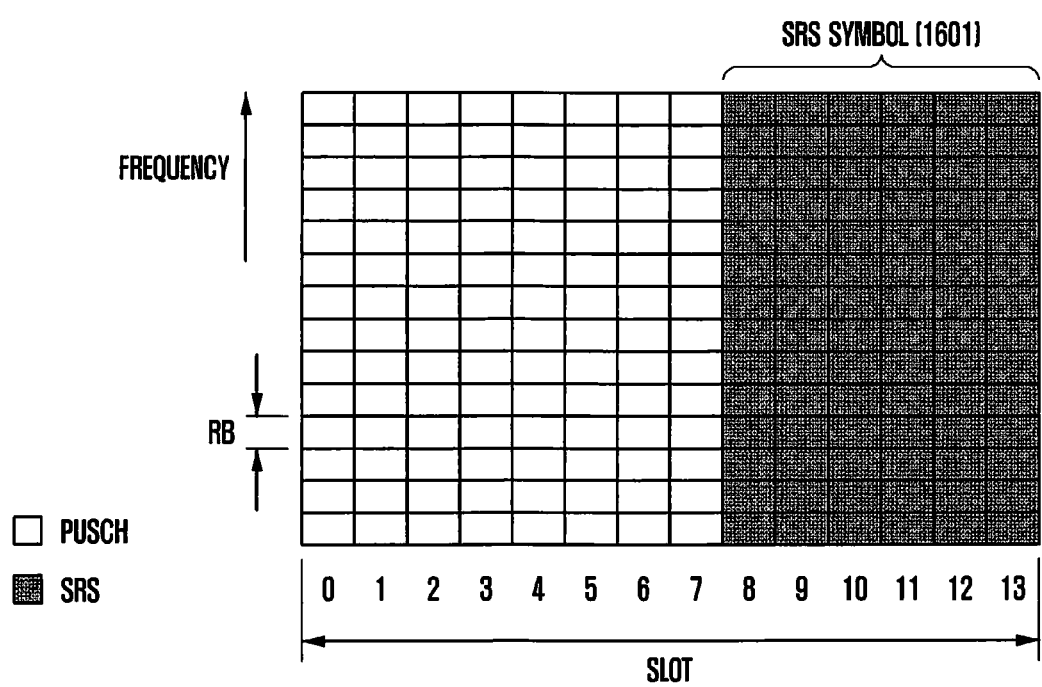
FIG. 16 is a diagram illustrating an example of configuring a sounding reference signal (SRS) in relation to an embodiment of the disclosure.

FIG. 16 is a diagram illustrating an example of configuring a sounding reference signal (SRS) in relation to an embodiment of the disclosure, and illustrates an example of the sounding reference signal (SRS), which is a reference signal for measuring channel state information in an uplink that can be used in a 3GPP NR system. The base station sets various SRS resources to the terminal (1601), and allows the terminal to transmit the SRS to determine a beam direction in an uplink situation. The base station may determine the optimal beam direction for the terminal by using the calculated beam direction information and measuring the SRS transmitted by the terminal, and may indicate the beam direction when transmitting uplink control information (PUCCH: physical uplink control channel) or data (PUSCH: physical uplink shared channel).

Figure 17:
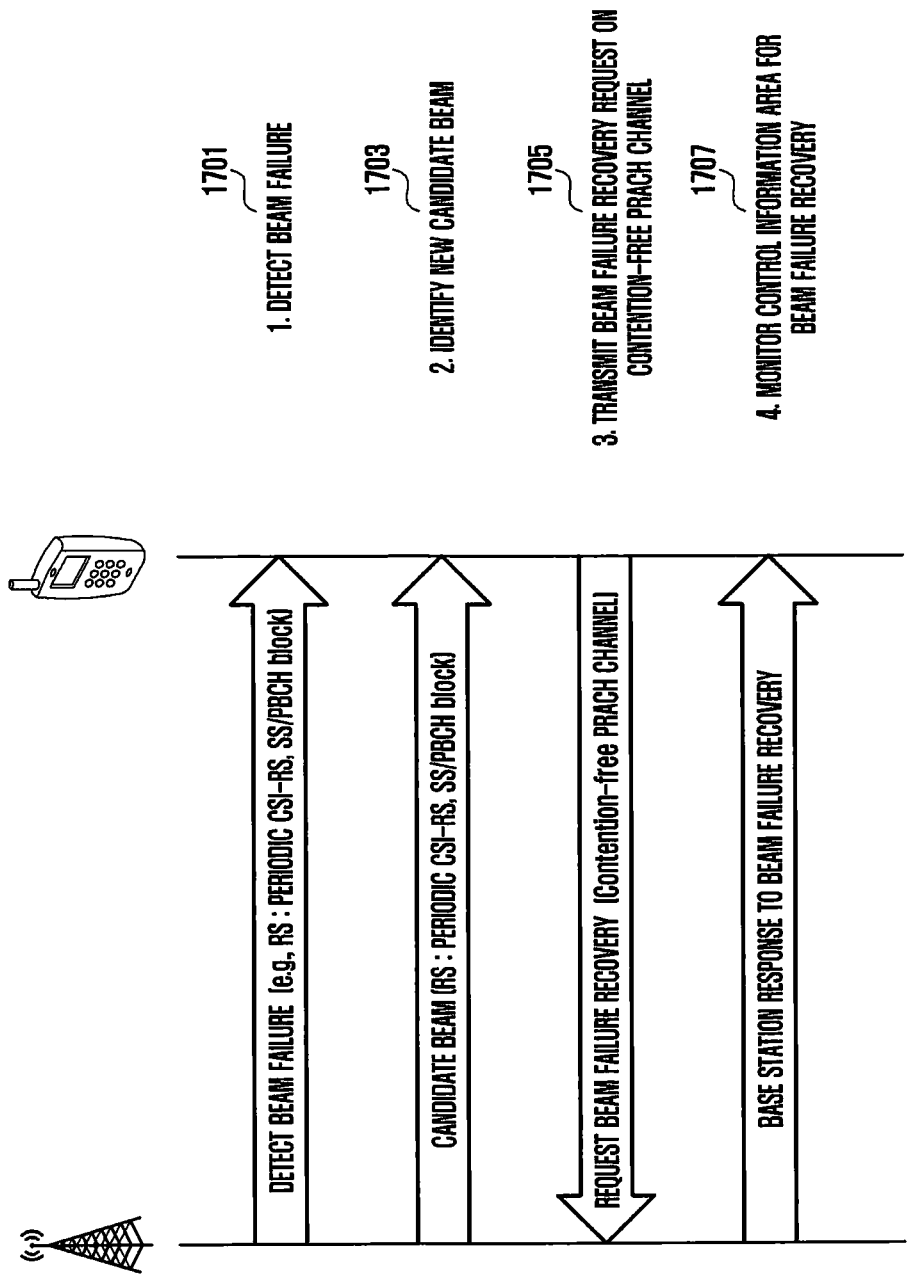
FIG. 17 is a diagram illustrating an example of a beam failure recovery process related to an embodiment of the disclosure.

FIG. 17 is a diagram illustrating an example of a beam failure recovery process related to an embodiment of the disclosure. The terminal may measure a CSI-RS or SS/PBCH block during communication with a base station, and for example, may receive and measure a periodic CSI-RS or SS/PBCH block to detect a beam failure (1701). The terminal may determine that a beam failure has occurred when the result measured in the CSI-RS or SS/PBCH block is less than a threshold value. Subsequently, the terminal may measure another CSI-RS or SS/PBCH block to select a new beam candidate (1703). The terminal may identify a new candidate beam to be used for beam failure recovery by measuring a CSI-RS or SS/PBCH block, and a beam corresponding to a CSI-RS or SS/PBCH block whose measured result is greater than or equal to a threshold may be selected as a new candidate beam.

The terminal may transmit a beam failure recovery request to the base station, and a random access procedure for transmitting a random access preamble on a physical random access channel (PRACH) to request beam failure recovery may be performed (1705). The terminal may request beam failure recovery by transmitting a random access preamble on a contention-free PRACH resource, and in the process of selecting a PRACH resource for requesting beam failure recovery, a PRACH resource corresponding to any one of the new candidate beams previously determined may be selected. In other words, the terminal may request a beam failure recovery by selecting a new candidate beam according to the result measured in operation 1703 and transmitting a random access preamble on the PRACH resource corresponding to the selected candidate beam. Subsequently, the base station transmits control information to the terminal in response to the beam failure recovery request transmitted by the terminal, and the terminal may attempt to detect control information transmitted by the base station by monitoring a control resource set (CORESET) for beam failure recovery (1707).

In the embodiment of FIG. 17, when a base station configures PRACH or PUCCH resources to a terminal, the resources that can be used may be configured differently depending on the location of the terminal. This may mean that the base station can configure PRACH and PUCCH resources according to the reception beam direction. This embodiment is shown in FIG. 18, and FIG. 18 is a view for explaining a reception beam direction of a base station according to an embodiment.

Figure 18:
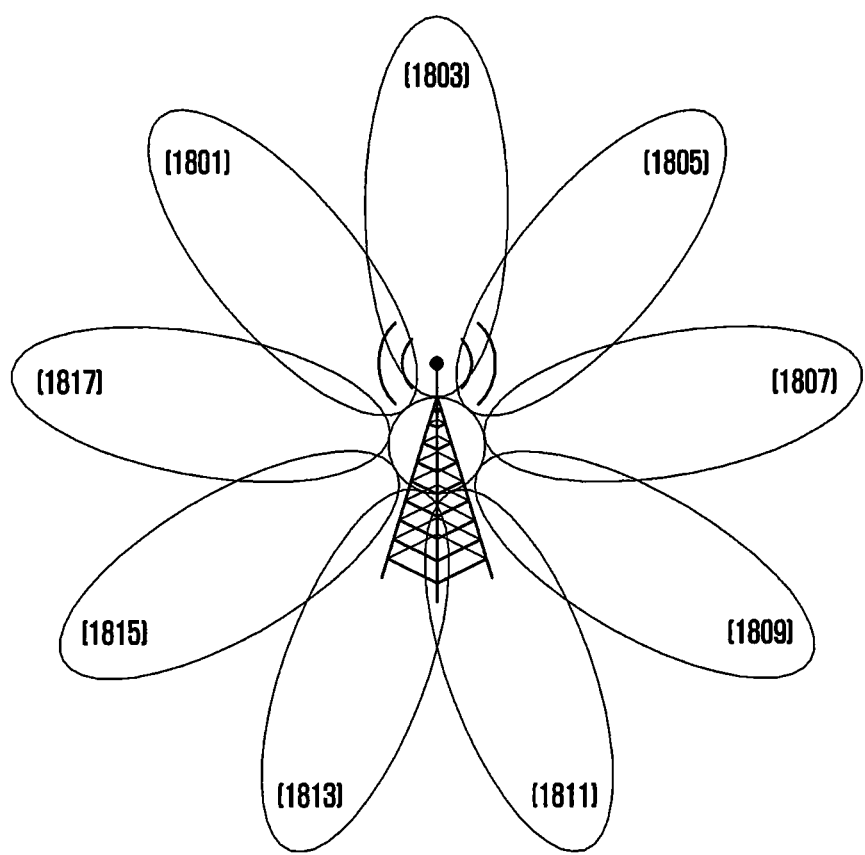
FIG. 18 is a view for explaining a reception beam direction of a base station according to an embodiment of the disclosure.

As shown in FIG. 18, when the direction of the reception beam of the base station is a total of nine directions, the base station may configure nine PRACH resources 1801, 1803, 1805, 1807, 1809, 1811, 1813, 1815, 1817 corresponding to the reception beam in nine directions for the terminal. In the configuration information for configuring the PRACH resource, information on the beam direction may be transmitted. The terminal may determine the PRACH resource on which the random access preamble is to be transmitted on the basis of the PRACH resource configured by the base station and its location at the time of transmitting the PRACH. This may be to match the direction of the reception beam of the base station in the direction in which the terminal transmits a signal. In this way, the terminal may determine the PRACH resource on the basis of its own location, and the transmission beam direction of the PRACH may be determined in consideration of the location of the terminal and the location of the base station.

Fifth Embodiment

Figure 19:
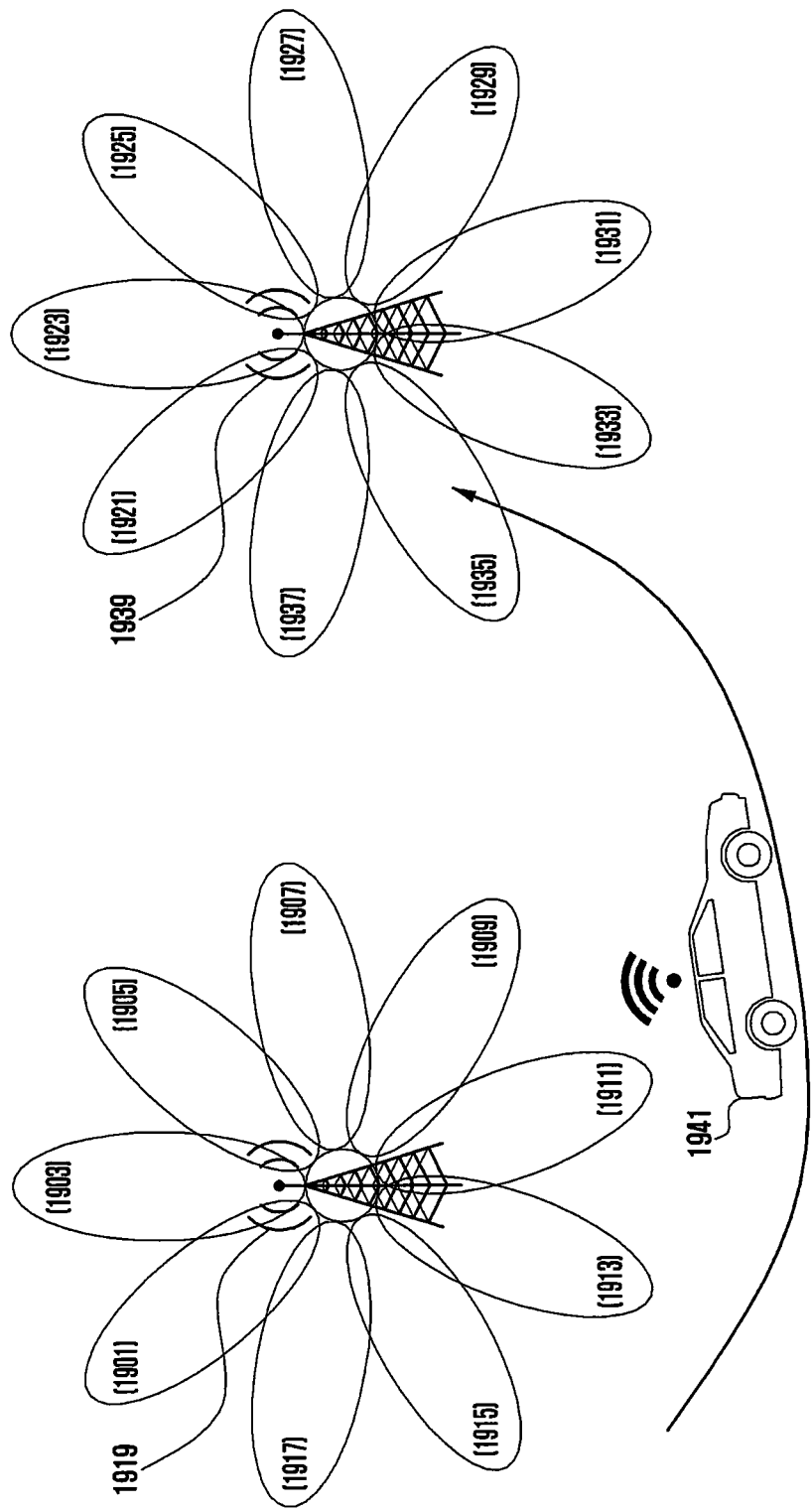
FIG. 19 is a diagram illustrating a method of managing a terminal beam in a handover process related to an embodiment of the disclosure.

FIG. 19 is a diagram illustrating a method of managing a terminal beam in a handover process related to an embodiment of the disclosure. In the fifth embodiment, in a process in which the terminal performs a handover, a method of efficiently managing a terminal beam by transmitting information on a beam direction from a base station to a terminal and a history of the beam direction between base stations will be described with reference to FIG. 19.

When the terminal 1941 moves from the base station A 1919 to a base station B 1939, the base station A may perform a handover procedure so that the terminal may communicate with the base station B. As the terminal moves within the coverage of base station A, the terminal may perform communication with the base station A while changing the base station transmission beam and base station reception beam directions from the base station A (1919) to (1915)-(1913)-(1911). As the handover procedure proceeds, the optimal transmission beam and reception beam directions of the base station B 1939 to the terminal 1941 may be (1935). Therefore, when the terminal 1941 communicates with the base station B 1939 immediately after the handover is finished, it may be most preferable to perform communication using the transmission beam and reception beam direction 1935 of the base station B 1939. If the terminal starts from SS/PBCH or CSI-RS measurement to find the optimal beam direction from the base station B 1939 after handover, it may take more time to find the optimal beam direction. Therefore, in order to allow rapid tracking of the optimal beam direction during handover, the base station A 1919 may transmit the location information and movement information of the terminal to the base station B 1939 in advance, and may also transmit the optimal beam direction to the terminal (e.g., information on the beam direction 1935) and history information (for example, information about the order of the beam directions 1915-1913-

1911) on the beam direction in advance to the base station B 1939. In addition, the base station A 1919 may help to quickly proceed to the beam failure recovery procedure when handing over to the base station B 1939 by transmitting the configuration information for the beam direction of the PRACH or PUCCH of the base station B 1939 to the terminal in advance.

In the above-described embodiments, the signaling method has been described using an example, but can be applied to various methods using one or more combinations of L1 signaling, MAC CE, and RRC signaling in the process of setting and transmitting/receiving information between the base station and the terminal.

According to the above-described embodiments, beam integration efficiency can be improved in a communication environment in which analog beamforming is applied. That is, as the beam selection is dynamically performed, the occurrence of a delay in recovering from a beam failure that may occur due to a change in position and movement of the terminal is reduced, thereby reducing the occurrence of unnecessary communication disconnection and making it smooth and continuous to improve user experience.

Figure 11:
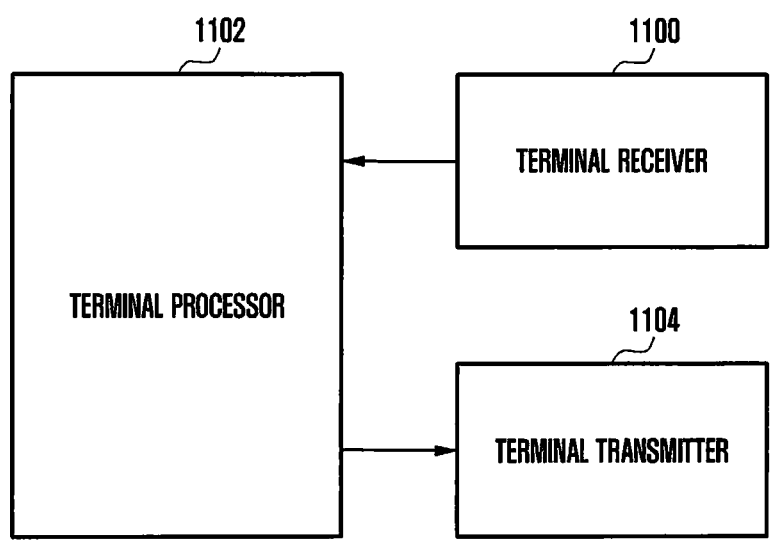
FIG. 11 is a diagram illustrating the internal structure of a terminal according to embodiments of the disclosure.
Figure 12:
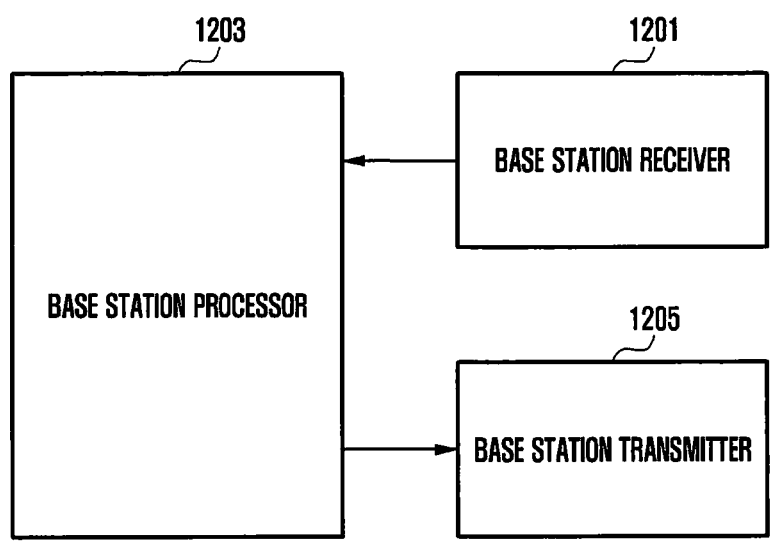
FIG. 12 is a diagram illustrating the internal structure of a base station according to embodiments of the disclosure.

To perform the above embodiments of the disclosure, transmitters, receivers, and processors of a terminal and a base station are illustrated in FIGS. 11 and 12, respectively. From the first embodiment to the fifth embodiment, a method of determining a transmission/reception beam direction for analog beamforming of a terminal and a base station is shown, and in order to perform this, the transmitters, receivers, and processors of the base station and the terminal should operate according to each embodiment.

Specifically, FIG. 11 is a block diagram illustrating the internal structure of a terminal according to an embodiment of the disclosure. As shown in FIG. 11, the terminal of the disclosure may include a terminal receiver 1100, a terminal transmitter 1104, and a terminal processor 1102. The terminal receiver 1100 and the terminal may collectively refer to the transmitter unit 1104 and may be referred to as a transceiver in an embodiment of the disclosure. The transceiver may transmit and receive signals to and from a base station. The signal may include control information and data. To this end, the transceiver may include an RF transmitter for up-converting and amplifying the frequency of the transmitted signal, an RF receiver for low-noise amplifying the received signal, and down-converting the frequency. In addition, the transceiver may receive a signal via a wireless channel, output the signal to the terminal processor 1102, and transmit a signal output from the terminal processor 1102 via the wireless channel. The terminal processor 1102 may control a series of processes so that the terminal can operate according to the above-described embodiment of the disclosure. For example, the terminal receiver 1100 may receive a signal including the location information of the base station from the base station, and the terminal processor 1102 may control to determine an optimal transmission/reception beam direction from the signal. Thereafter, the terminal transmitter 1104 performs data transmission using the transmission beam direction determined using the transmitted information.

FIG. 12 is a block diagram illustrating the internal structure of a base station according to an embodiment of the disclosure. As illustrated in FIG. 12, the base station of the disclosure may include a base station receiver 1201, a base station transmitter 1205, and a base station processor 1203. The base station receiver 1201 and the base station transmitter 1205 may be collectively referred to as a transceiver in an embodiment of the disclosure. The transceiver may transmit and receive signals to and from the terminal. The signal may include control information and data. To this end, the transceiver may include an RF transmitter for up-converting and amplifying the frequency of the transmitted signal, an RF receiver for low-noise amplifying the received signal, and down-converting the frequency. In addition, the transceiver may receive a signal via a wireless channel, output the signal to the base station processor 1203, and transmit the signal output from the base station processor 1203 via the wireless channel. The base station processor 1203 may control a series of processes so that the base station can operate according to the above-described embodiment of the disclosure. For example, the base station processor 1203 generates information such as the location, speed, and acceleration of the base station, and generates a signal for transmitting it to the terminal. Thereafter, the base station transmitter 1205 transmits the information, and the base station receiver 1201 performs reception of a signal transmitted by the terminal according to the configuration.

On the other hand, the embodiments of the disclosure disclosed in the specification and drawings are merely to provide a specific example to easily explain the technical contents of the disclosure and to aid in understanding of the disclosure, and are not intended to limit the scope of the disclosure. That is, it will be apparent to those skilled in the art that other modifications based on the technical idea of the disclosure can be practiced. In addition, one or more of the above embodiments may be operated in combination with each other as necessary. For example, the first embodiment and the fifth embodiment of the disclosure may be combined with each other to operate a base station and a terminal. Further, although the above embodiments have been presented based on the NR system, other systems based on the technical idea of the above embodiments may be implemented in other systems such as a 5G or LTE system.

The invention claimed is:

1. A method performed by a terminal in a wireless communication system, the method comprising:
   receiving, from a base station, a first message including first information for configuring a parameter to be reported for selection of a base station beam and second information for configuring a triggering condition for a report of the parameter;
   generating location information and movement information of the terminal based on the first information;
   transmitting, to the base station, a second message including the location information and the movement information based on the second information; and
   receiving, from the base station, a third message including information on the base station beam selected based on the location information and the movement information,
   wherein the location information includes an amount of change in location of the terminal measured during a first time period and information on the first time period,
   wherein the movement information includes an amount of change in movement of the terminal measured during a second time period and information on the second time period, and
   wherein the base station beam corresponds to a predetermined path expected based on the amount of change in location and the amount of change in movement.

2. The method of claim 1, wherein the location information includes a 3-dimensional coordinate for the amount of change in location, and wherein the movement information includes information on an amount of change in direction, an amount of change in speed, an amount of change in acceleration, and an amount of change in angular acceleration of the terminal during the second time period.

3. The method of claim 1, further comprising:
detecting a beam failure during communication with the base station; and
requesting a beam failure recovery on a resource corresponding to the base station beam.

4. The method of claim 1, further comprising:
transmitting, before the receiving of the first message, information indicating that the terminal supports the report of the location information and the movement information,
wherein the second message is transmitted to the base station periodically or aperiodically according to the triggering condition based on the second information, and
wherein history information on a change of the base station beam is transmitted to a target base station for a handover of the terminal in case that the base station beam is changed according to a movement of the terminal during communication with the base station.

5. A terminal in a wireless communication system, the terminal comprising:
a transceiver configured to transmit or receive a signal; and
a controller coupled with the transceiver and configured to:
receive, from a base station, a first message including first information for configuring a parameter to be reported for selection of a base station beam and second information for configuring a triggering condition for a report of the parameter,
generate location information and movement information of the terminal based on the first information,
transmit, to the base station, a second message including the location information and the movement information based on the second information, and
receive, from the base station, a third message including information on the base station beam selected based on the location information and the movement information,
wherein the location information includes an amount of change in location of the terminal measured during a first time period and information on the first time period,
wherein the movement information includes an amount of change in movement of the terminal measured during a second time period and information on the second time period, and
wherein the base station beam corresponds to a predetermined path expected based on the amount of change in location and the amount of change in movement.

6. The terminal of claim 5, wherein the location information includes a 3-dimensional coordinate for the amount of change in location, and
wherein the movement information includes information on an amount of change in direction, an amount of change in speed, an amount of change in acceleration, and an amount of change in angular acceleration of the terminal during the second time period.

7. The terminal of claim 5, wherein the controller is further configured to:
detect a beam failure during communication with the base station; and
request a beam failure recovery on a resource corresponding to the base station beam.

8. The terminal of claim 5, wherein the controller is configured to transmit, before the receiving of the first message, information indicating that the terminal supports the report of the location information and the movement information, and
wherein the second message is transmitted to the base station periodically or aperiodically according to the triggering condition based on the second information, and
wherein history information on the change of the base station beam is transmitted to a target base station for a handover of the terminal in case that the base station beam is changed according to a movement of the terminal during communication with the base station.

9. A method performed by a base station in a wireless communication system, the method comprising:
transmitting, to a terminal, a first message including first information for configuring a parameter to be reported for selection of a base station beam and second information for configuring a triggering condition for a report of the parameter;
receiving, from the terminal, a second message based on the second information, the second message including location information and movement information generated based on the first information;
selecting the base station beam for communicating with the terminal based on the location information and the movement information; and
transmitting, to the terminal, a third message including information on the selected base station beam,
wherein the location information includes an amount of change in location of the terminal measured during a first time period and information on the first time period,
wherein the movement information includes an amount of change in movement of the terminal measured during a second time period and information on the second time period, and
wherein the selected base station beam corresponds to a predetermined path expected based on the amount of change in location and the amount of change in movement.

10. The method of claim 9, wherein the location information includes a 3-dimensional coordinate for the amount of change in location, and
wherein the movement information includes information on an amount of change in direction, an amount of change in speed, an amount of change in acceleration, and an amount of change in angular acceleration of the terminal during the second time period.

11. The method of claim 9, further comprising:
receiving, from the terminal, a signal requesting a beam failure recovery on a resource corresponding to the selected base station beam based on a detection of a beam failure; and
receiving, before the transmitting of the first message, information indicating that the terminal supports the report of the location information and the movement information,
wherein the second message is received from the terminal periodically or aperiodically according to the triggering condition based on the second information, and
wherein history information on a change of the base station beam is transmitted to a target base station for a handover of the terminal in case that the base station beam is changed according to a movement of the terminal during communication with the terminal.

12. A base station in a wireless communication system, the base station comprising:
   a transceiver configured to transmit or receive a signal; and
   a controller coupled with the transceiver and configured to:
      transmit, to a terminal, a first message including first information for configuring parameter to be reported for selection of a base station beam and second information for configuring a triggering condition for a report of the parameter,
      receive, from the terminal, a second message based on the second information, the second message including location information and movement information generated based on the first information,
      select the base station beam for communicating with the terminal based on the location information and the movement information, and
      transmit, to the terminal, a third message including information on the selected base station beam,
   wherein the location information includes an amount of change in location of the terminal measured during a first time period and information on the first time period,
   wherein the movement information includes an amount of change in movement of the terminal measured during a second time period and information on the second time period, and
   wherein the selected base station beam corresponds to a predetermined path expected based on the amount of change in location and the amount of change in movement.

13. The base station of claim 12, wherein the location information includes a 3-dimensional coordinate for the amount of change in location, and
   wherein the movement information includes information on an amount of change in direction, an amount of change in speed, an amount of change in acceleration, and an amount of change in angular acceleration of the terminal during the second time period.

14. The base station of claim 12, wherein the controller is further configured to receive, from the terminal, a signal requesting a beam failure recovery on a resource corresponding to selected base station beam based on a detection of a beam failure.

15. The base station of claim 12, wherein the controller is further configured to:
   receive, before the transmitting of the first message, information indicating that the terminal supports the report of the location information and the movement information,
   wherein the second message is received from the terminal periodically or aperiodically according to the triggering condition based on the second information, and
   wherein transmit history information on a change of the base station beam is transmitted to a target base station for the handover of the terminal in case that the base station beam is changed according to a movement of the terminal during communication with the terminal.

* * * * *